United States Patent
Brees et al.

(10) Patent No.: US 7,677,033 B2
(45) Date of Patent: Mar. 16, 2010

(54) APPARATUS FOR JOINING COMPONENTS TO A HUB

(75) Inventors: William Brees, Wooster, OH (US); Steven Olsen, Wooster, OH (US); Edward Smeltzer, Ashland, OH (US)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 371 days.

(21) Appl. No.: 11/799,684

(22) Filed: May 2, 2007

(65) Prior Publication Data

US 2007/0256905 A1    Nov. 8, 2007

Related U.S. Application Data

(60) Provisional application No. 60/797,518, filed on May 4, 2006.

(51) Int. Cl.
*F01D 5/22* (2006.01)
*F16D 33/00* (2006.01)

(52) U.S. Cl. .......................... 60/345; 60/364
(58) Field of Classification Search .............. 60/330, 60/341, 345, 364
See application file for complete search history.

(56) References Cited

U.S. PATENT DOCUMENTS

| 4,425,082 | A |   | 1/1984  | Mussi et al. |            |
|-----------|---|---|---------|--------------|------------|
| 4,573,875 | A |   | 3/1986  | Emeterio et al. |         |
| 5,161,867 | A |   | 11/1992 | Johnson      |            |
| 5,224,348 | A | * | 7/1993  | Ejiri        | 60/361     |
| 6,024,538 | A | * | 2/2000  | Tanishiki et al. | 60/330 |
| 6,039,163 | A |   | 3/2000  | Bassett et al. |          |
| 6,099,435 | A | * | 8/2000  | Halene et al. | 477/62    |
| 6,223,872 | B1|   | 5/2001  | Heller et al.|            |
| 6,354,413 | B2|   | 3/2002  | Heller et al.|            |
| 6,494,303 | B1|   | 12/2002 | Reik et al.  |            |
| 6,745,563 | B1| * | 6/2004  | Shue         | 60/345     |
| 6,807,808 | B2| * | 10/2004 | Okada et al. | 60/361     |
| 6,931,844 | B2|   | 8/2005  | Iwao et al.  |            |
| 7,044,279 | B2| * | 5/2006  | Leber        | 192/3.25   |
| 7,454,902 | B2| * | 11/2008 | Fukunaga et al. | 60/330 |
| 2001/0015308 | A1 |   | 8/2001 | Heller et al. |          |

* cited by examiner

*Primary Examiner*—Thomas E Lazo
(74) *Attorney, Agent, or Firm*—Simpson & Simpson, PLLC

(57) ABSTRACT

The present invention broadly includes a hub assembly for a torque converter having a hub arranged to rotationally connect to a transmission input shaft and includes first and second radial surfaces, a first plate rotationally connected to a turbine, rotationally connected to the hub, and fixed in a first axial direction by the first surface and a second plate rotationally connected to the first plate and fixed in a second axial direction, opposite the first direction, by the second surface. The hub assembly may include a hub having at least one radially disposed protrusion, the protrusion includes the second radial surface, and the first plate is rotationally connected to the protrusion. The hub may further include a body with a first diameter and the protrusion with a second diameter greater than the first diameter. The first and second radial surfaces may be arranged to axially fix a turbine with respect to the hub, or the first and second radial surfaces may be coplanar. The first plate may be in contact with the first radial surface, or the second plate may be in contact with the second radial surface.

34 Claims, 10 Drawing Sheets

PRIOR ART
Fig. 4
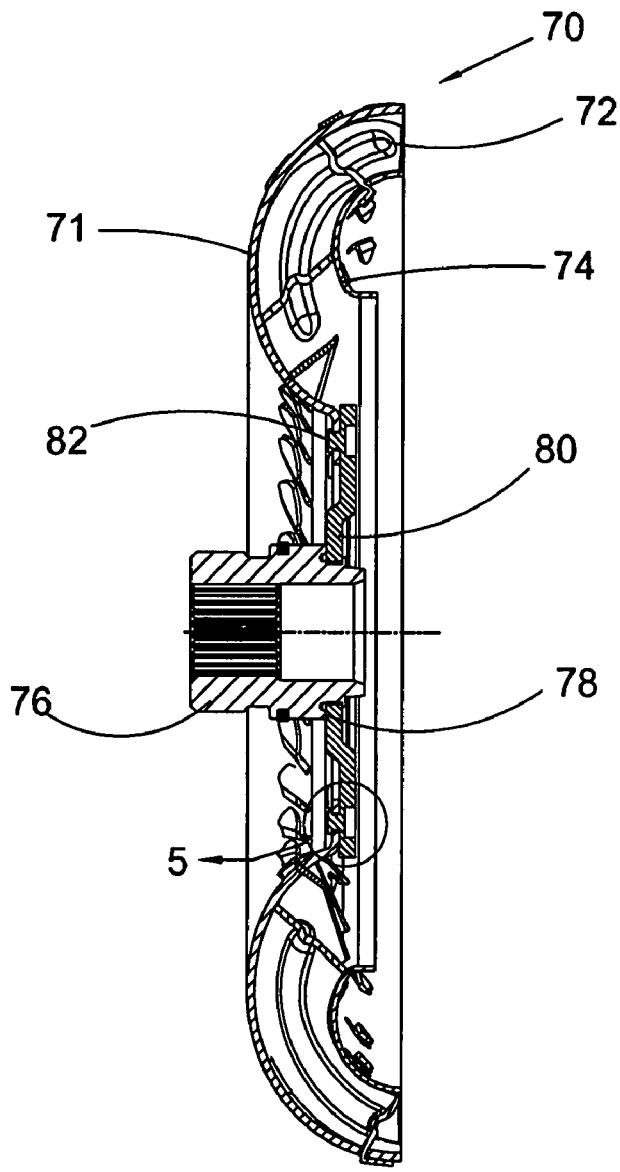
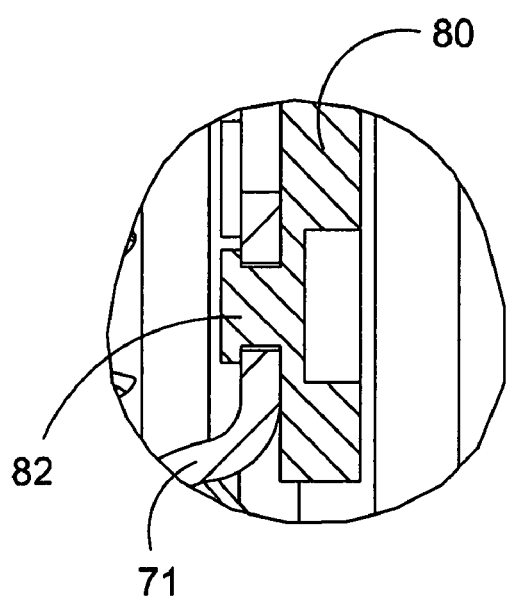
Fig. 5

APPARATUS FOR JOINING COMPONENTS TO A HUB

CROSS-REFERENCE TO RELATED APPLICATIONS

This patent application claims the benefit under 35 U.S.C. §119(e) of U.S. Provisional Application No. 60/797,518, filed May 4, 2006, which application is incorporated herein by reference.

FIELD OF THE INVENTION

The present invention relates generally to torque converters, more particularly, to a torque converter hub, and, more specifically, to an apparatus for joining components to a torque converter hub.

BACKGROUND

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter, arranged between the engine and the transmission, includes three primary components, an impeller, sometimes referred to as a pump, directly connected to the converter's cover and thereby the engine's crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

As is well known in the art, a hub is often used to transfer torque between the turbine and the transmission input shaft. Various embodiments of hubs are used, and typically take the form of a cylindrical part having an internal spline arranged to engage a transmission input shaft and an external extension arranged to engage a turbine and/or spring retainer. Although using a hub of this type is perhaps the most common means of coupling the turbine to the transmission input shaft, this hub type is expensive to manufacture and introduces a significant amount of mass to the torque converter. The expense is in part derived from the large quantity of material that must be used to form a hub of this type, as well as the complexity from the added machining and finishing operations that are required. In short, the extension adds a substantial amount of cost to the hub because it requires more material and a larger die is required for forged or powdered metal pieces. Components may be joined to a hub with laser welding, however this also requires a radial extension and riveting.

FIG. 1 shows a front plan view of prior art torque converter 10, while FIG. 2 shows a partial cross-sectional view of torque converter 10 taken generally along line 2-2 of FIG. 1. Torque converter 10 includes studs 12 arranged to engage a rotary drive engine fly wheel (not shown), thereby imparting rotational force, i.e., torque, to the torque converter. Torque converter 10 is enclosed by front and back housing shells 14 and 16, respectively. Shells 14 and 16 are fixedly secured to each other by weld 18. Back housing shell 16 forms the body of pump 20. Pump 20 further includes blades 22 and core ring 24. Turbine 26 is disposed opposite pump 20 within the volume enclosed by housing shells 14 and 16. Turbine 26 includes turbine shell 28 which holds blades 30, which in turn are connected by core ring 32. Stator 34 is disposed between pump 20 and turbine 26, and blades 36 are arranged to redirect the flow of fluid (not shown) exiting turbine 26 prior to entering pump 20. During periods of use when the rotation of turbine 26 is less than the rotation of pump 20, stator 34 is prevented from rotating via the interaction between one-way clutch 38 and hub 40, as spline 42 of hub 40 non-rotatably engages a fixed shaft from a transmission (not shown), thereby preventing rotation of hub 40. As the ratio of rotational speeds between pump 20 and turbine 26 approaches unity, one-way clutch 38 permits stator 34 to freewheel, thus permitting it rotate at a speed substantially similar to pump 20 and turbine 26. As the drive engine supplies torque, housing shells 14 and 16 are rotated and thus pump 20 is also rotated. The rotation of pump 20 forces fluid from pump 20 into turbine 26, which in turn causes turbine 26 to rotate. The fluid passes through blades 36 of stator 34, is redirected, and subsequently returns to pump 20 to repeat the cycle.

Turbine shell 28, and thus turbine 26, is fixedly secured to spring retainer 44 and flange 46 of hub 48 via rivets 50. Rivets 50 are disposed within holes 52, 54 and 56 of flange 46, turbine shell 28 and spring retainer 44, respectively. Hence, as turbine 26 rotates, spring retainer 44 and hub 48 also rotate. Spring retainer 44 engages one end of spring 58 (not shown) while flange 60 of torque converter clutch 62 engages the other end of spring 58. Torque converter clutch 62 provides means to rotationally connect first housing shell 14 to hub 48. Thus, as the rotational speed of turbine 26 approaches that of pump 20, clutch 62 may be actuated, thereby compressively engaging friction material 64 with inner surface 66 of first housing shell 14. The engagement of clutch 62 provides a direct connection between the rotary drive engine and a rotary driven unit, i.e., transmission, thereby improving the efficiency of power transfer via the following path: first housing shell 14, friction material 64, flange 60, springs 58, spring retainer 44, rivet 50, flange 46, hub 48, spline 68 and lastly an input shaft of a rotary driven unit (not shown). Under such conditions, springs 58 act as vibration dampers, thereby reducing the transfer of engine power pulses.

FIG. 3 shows a front plan view of another prior art torque converter turbine 70 having turbine shell 71 wherein a plurality of blades 72, joined by core ring 74, are disposed. FIG. 4 shows a cross-sectional view taken generally along line 4-4 of FIG. 3, while FIG. 5 shows an enlarged partial cross-sectional view of the encircled region 5 of FIG. 4. Including flange 46 on hub 48 increases the cost to produce hub 48 due to the added material and the manufacturing processes which must be used to form such a configuration. In an effort to reduce the cost of producing a hub, alternative designs have developed. For example, in this prior art turbine, hub 76 is formed with shoulder 78 which provides an axial stop for drive plate 80. In this embodiment, various known means for retaining drive plate 80 to hub 76 may be used, e.g., welding or press fitting. Thus, in this instance, turbine 70 drives hub 76 via rivets 82, drive plate 80, and a weld (not shown) between drive plate 80 and hub 76.

Added mass can decrease the fuel economy of a vehicle. A torque converter must rotate in order to transfer torque between the engine and the transmission. Any mass added to the torque converter must also be rotated during this transfer process. Due to the principle of mass moment of inertia, i.e., a measure of a solid object's resistance to changes in rotational speed about its rotational axis, it can be shown mathematically that an object having a greater mass will have a greater mass moment of inertia. The mass moment of inertia I for a torque converter can be approximated by the following formula used for a thin disk having a radius r and a mass m:

$$I = \frac{mr^2}{2}$$

Thus it can be seen that I is directly proportional to m, and therefore as m increases, I also increases. In view of this relationship between resistance to rotation, i.e., the amount of power required by the engine to drive the torque converter and the mass of the object rotating, the resistance to rotation may be decreased by removing mass from the torque converter, and thus increase the efficiency of power transfer from the engine to the transmission. It generally follows that removing mass from a torque converter hub, and thereby the torque converter, increases the efficiency of power transfer from the engine to the transmission.

As can be derived from the variety of devices and methods directed at coupling a torque converter turbine to a transmission, many means have been contemplated to accomplish the desired end, i.e., reliable, cost-effective coupling comprising easily manufactured parts, without sacrificing mass moment of inertia, and thus resulting in higher fuel efficiency and performance. Heretofore, tradeoffs between strength and reliability of coupling means, methods of manufacturing component parts and material mass for such means were required. Thus, there has been a longfelt need for a cost-effective torque converter hub having high strength and reliability, while introducing a minimal mass to the overall torque converter assembly, which is simple to manufacture.

BRIEF SUMMARY OF THE INVENTION

The present invention broadly includes a hub assembly for a torque converter having a hub arranged to rotationally connect to a transmission input shaft and includes first and second radial surfaces, a first plate rotationally connected to a turbine, rotationally connected to the hub, and fixed in a first axial direction by the first surface and a second plate rotationally connected to the first plate and fixed in a second axial direction, opposite the first direction, by the second surface. The hub assembly may include a hub having at least one radially disposed protrusion, the protrusion includes the second radial surface, and the first plate is rotationally connected to the protrusion. The hub may further include a body with a first diameter and the protrusion may include a second diameter greater than the first diameter. The hub assembly may include at least two rivets arranged to secure the first and second plates. The second plate may be integrally formed with the turbine or separately formed from and fixedly connected to the turbine. The torque converter in the hub assembly may include a first spring retainer and the second plate is rotationally connected to the spring retainer. The second plate may be integrally formed with the spring retainer, or may be separately formed from and fixedly connected to the spring retainer. The first and second radial surfaces may be arranged to axially fix the turbine with respect to the hub, or the first and second radial surfaces may be coplanar. The first plate may be in contact with the first radial surface, or the second plate may be in contact with the second radial surface.

In another embodiment, the hub assembly for a torque converter includes a hub arranged to rotationally connect to a transmission input shaft and includes first and second radial surfaces, a first plate rotationally connected to a turbine and fixed in a first axial direction by the first surface, a second plate rotationally connected to a spring retainer and fixed in a second axial direction, opposite the first direction, by the second surface and a third plate rotationally connected to the hub and the first and second plates.

In a further embodiment, the hub assembly for a torque converter includes a hub arranged to rotationally connect to a transmission input shaft and includes first and second radial surfaces, a first plate rotationally connected to a turbine and the hub, a second plate rotationally connected to a spring retainer and fixed in a first axial direction by the first radial surface, and a third plate axially connected to the first and second plates and fixed in a second axial direction, opposite the first direction, by the second surface.

In yet another embodiment, the hub assembly for a torque converter includes a hub arranged to rotationally connect to a transmission input shaft and includes first and second radial surfaces, a plate fixedly connected to a turbine, rotationally connected to the hub, and fixed in a first axial direction by the first surface, and a spring retainer fixedly connected to the plate and fixed in a second axial direction, opposite the first direction, by the second surface.

In still yet another embodiment, the hub assembly for a torque converter includes a hub arranged to rotationally connect to a transmission input shaft and includes first and second radial surfaces, a plate fixedly connected to a turbine, rotationally connected to the hub, and fixed in a first axial direction by the first surface, and a turbine fixedly connected to the plate, and fixed in a second axial direction, opposite the first direction, by the second surface.

A general object of the invention is to provide cost effective means for joining a torque converter turbine and/or a spring retainer to a hub.

Another object of the invention is to provide space efficient means for joining a torque converter turbine and/or spring retainer to a hub.

Yet another object of the invention is to reduce the mass of a torque converter hub.

A further object of the invention is to provide a hub arrangement that is easy to assemble and which prevents axial displacement between a torque converter turbine and the hub.

And yet a further object of the invention is to provide a hub which is manufactured in part from stamped components.

These and other objects, features, and advantages of the present invention will become readily apparent to one having ordinary skill in the art upon reading the detailed description of the invention in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 4 is a cross-sectional view taken generally along line 4-4 of FIG. 3;

FIG. 5 is an enlarged partial cross-sectional view of the encircled region 5 of FIG. 4;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiment, it is to be understood that the invention as claimed is not limited to the preferred embodiment.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 10A:
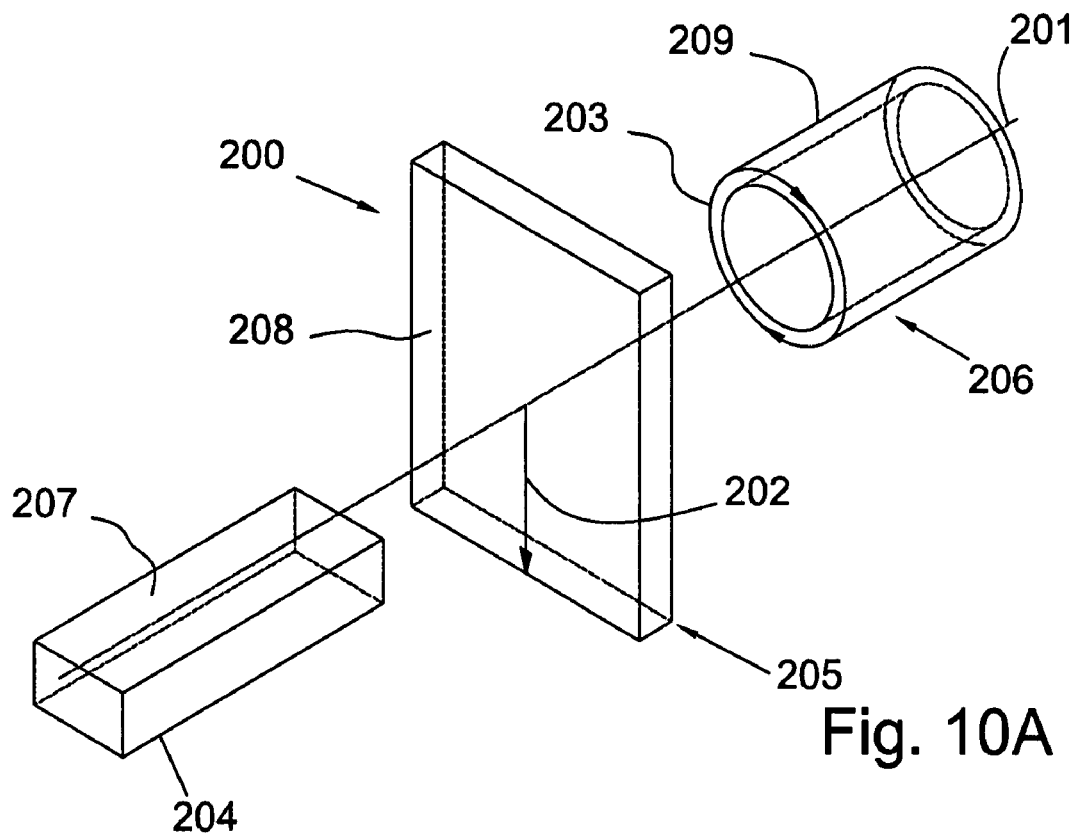
FIG. 10A is a perspective view of a cylindrical coordinate system demonstrating spatial terminology used in the present application; and, FIG. 10B is a perspective view of an object in the cylindrical coordinate system of FIG. 10A demonstrating spatial terminology used in the present application.

FIG. 10A is a perspective view of cylindrical coordinate system 200 demonstrating spatial terminology used in the present application. The present invention is at least partially described within the context of a cylindrical coordinate system. System 200 has a longitudinal axis 201, used as the reference for the directional and spatial terms that follow. The adjectives "axial," "radial," and "circumferential" are with respect to an orientation parallel to axis 201, radius 202 (which is orthogonal to axis 201), and circumference 203, respectively. The adjectives "axial," "radial" and "circumferential" also are regarding orientation parallel to respective planes. To clarify the disposition of the various planes, objects 204, 205, and 206 are used. Surface 207 of object 204 forms an axial plane. That is, axis 201 forms a line along the surface. Surface 208 of object 205 forms a radial plane. That is, radius 202 forms a line along the surface. Surface 209 of object 206 forms a circumferential plane. That is, circumference 203 forms a line along the surface. As a further example, axial movement or disposition is parallel to axis 201, radial movement or disposition is parallel to radius 202, and circumferential movement or disposition is parallel to circumference 203. Rotation is with respect to axis 201.

The adverbs "axially," "radially," and "circumferentially" are with respect to an orientation parallel to axis 201, radius 202, or circumference 203, respectively. The adverbs "axially," "radially," and "circumferentially" also are regarding orientation parallel to respective planes.

Figure 10B:
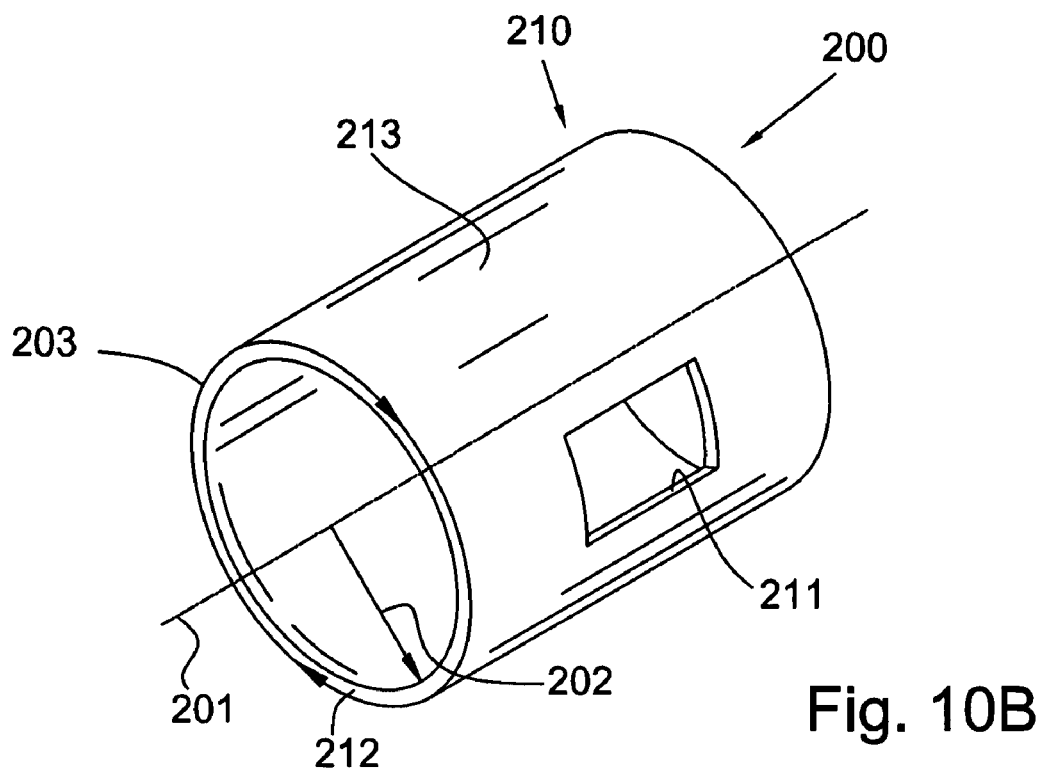

FIG. 10B is a perspective view of object 210 in cylindrical coordinate system 200 of FIG. 10A demonstrating spatial terminology used in the present application. Cylindrical object 210 is representative of a cylindrical object in a cylindrical coordinate system and is not intended to limit the present invention is any manner. Object 210 includes axial surface 211, radial surface 212, and circumferential surface 213. Surface 211 is part of an axial plane, surface 212 is part of a radial plane, and surface 213 is part of a circumferential plane.

Figure 1:
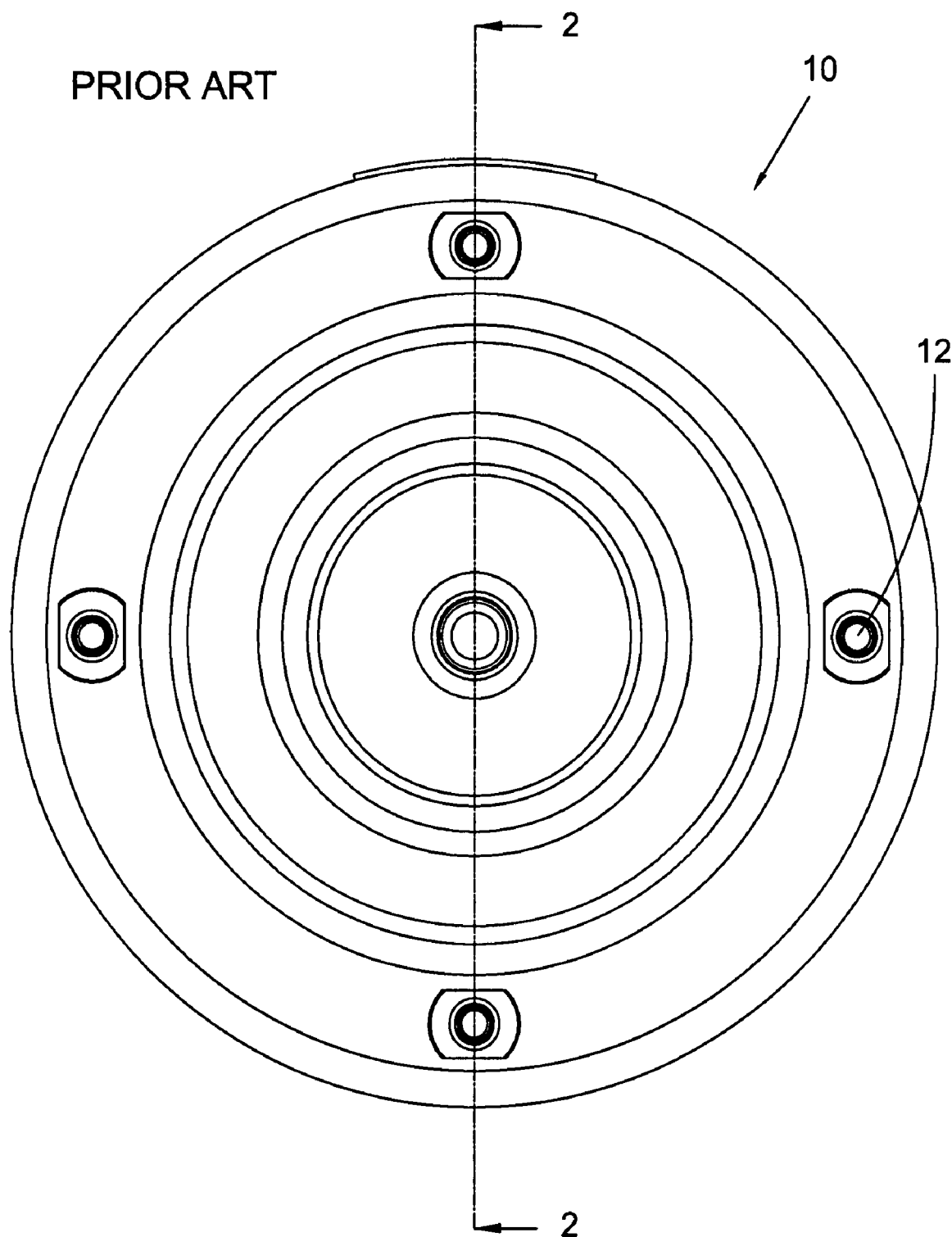
FIG. 1 is a front plan view of a prior art torque converter.
Figure 2:
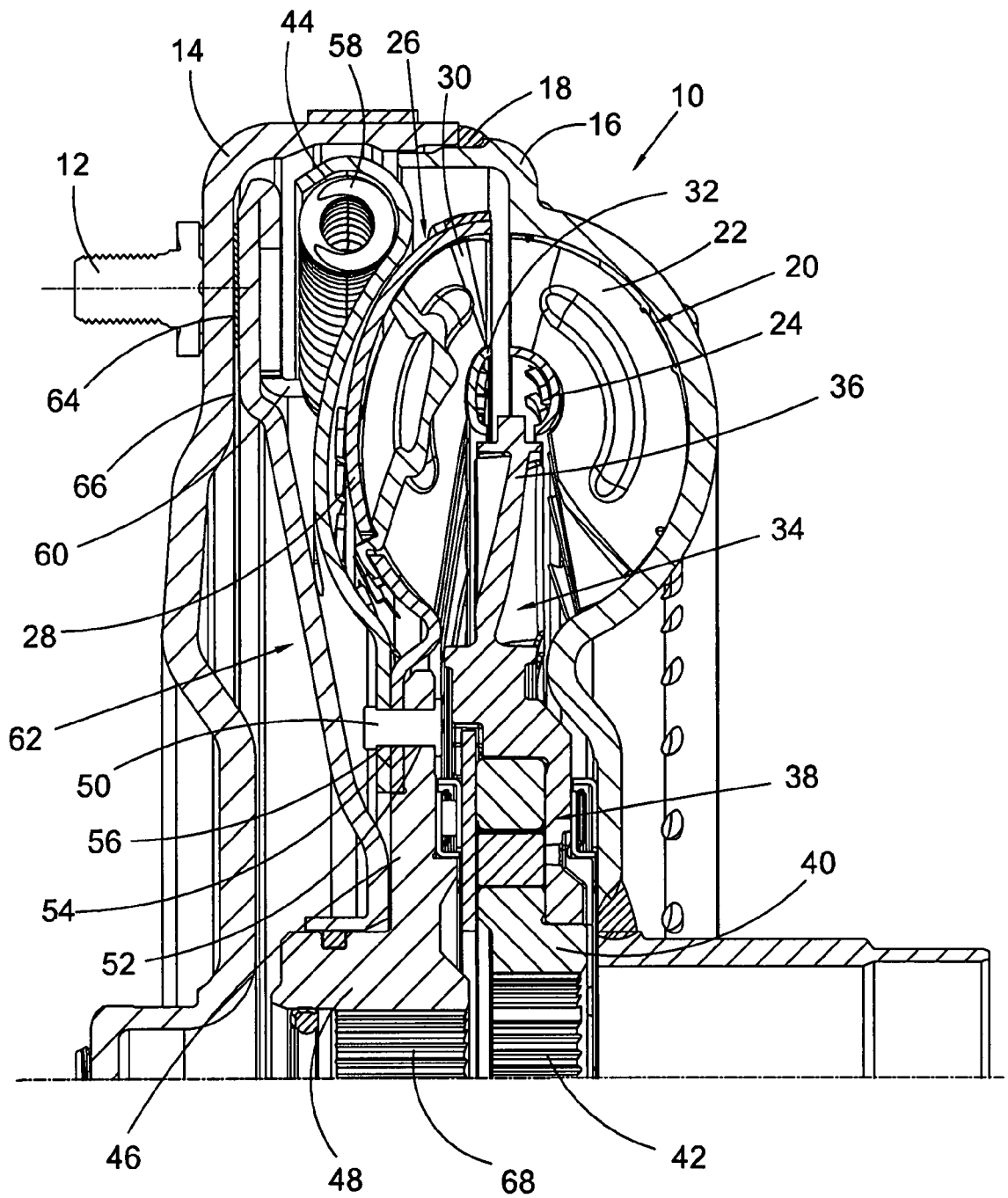
FIG. 2 is a partial cross-sectional view taken generally along line 2-2 of FIG. 1.
Figure 3:
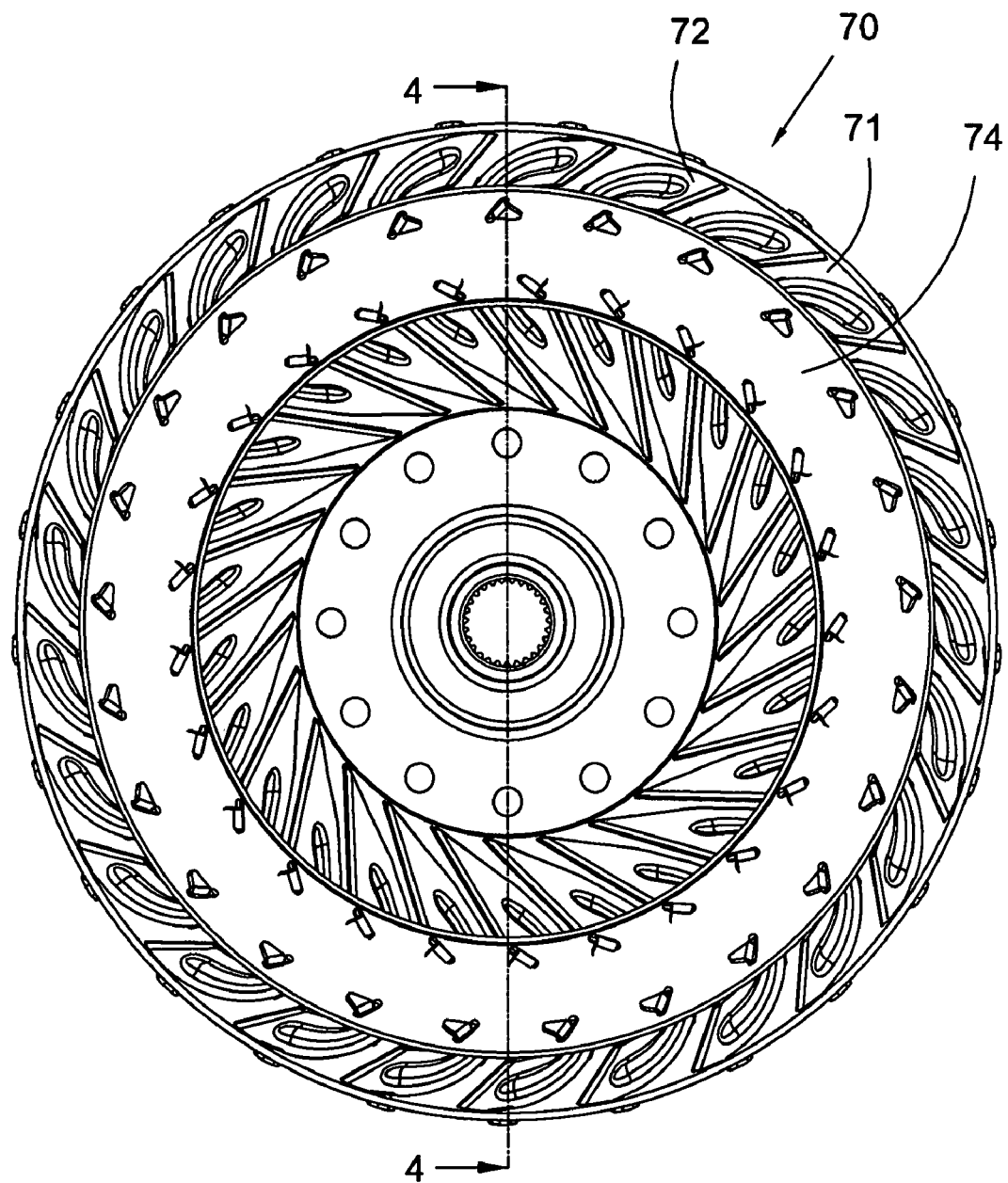
FIG. 3 is a back plan view of a prior art torque converter turbine having a plurality of blades forming said turbine.
Figure 6A:
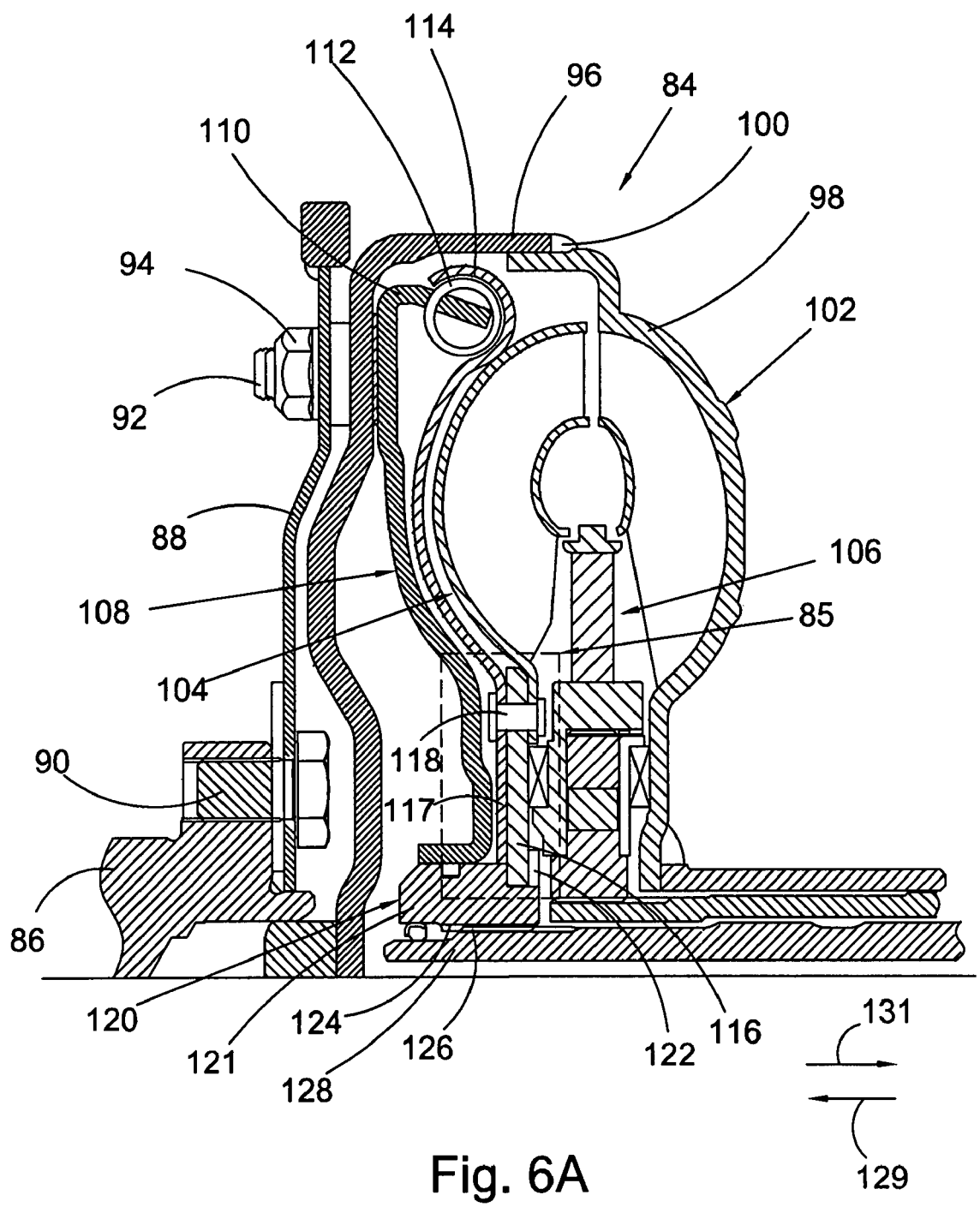
FIG. 6A is a partial cross-sectional view of a torque converter with a present invention hub assembly.

FIG. 6A is a partial cross-sectional view of torque converter 84 with present invention hub assembly 85. Crankshaft 86 is fixedly secured to flexplate 88 via bolts 90, while flexplate 88 is fixedly secured to studs 92 with nuts 94, and thereby front housing shell 96. Additionally, front housing shell 96 is secured to back housing shell 98 via weld 100. Torque converter 84 includes pump 102, turbine 104 and stator 106, disposed therebetween. Additionally, converter 84 includes torque converter clutch 108 arranged to frictionally engage housing shell 96 and having flange 110 arranged to engage springs 112. The positions of springs 112 are maintained by spring retainer 114, and torque is transferred from springs 112 through their engagement with spring retainer 114, as described supra.

In this embodiment, drive plate 116 is rotationally connected to turbine 104 and plate 117 is rotationally connected to retainer 114. By rotationally connected, or secured, we mean that drive plate 116 and turbine 104 are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified. In some aspects, plate 116 is separately formed from the turbine and fixedly connected to the turbine by any means known in the art, for example, rivets 118. In some aspects (not shown), plate 116 is integrally formed with the turbine. In some aspects, plate 117 is integrally formed with the spring retainer. In some aspects (not shown), plate 117 is separately formed from the retainer and fixedly connected to the turbine by any means known in the art.

Drive plate 116 is rotationally connected to hub 120 having body 121. Hub 120 includes at least one radially disposed protrusion. In some aspects, the protrusion is spline 122 and plate 116 is rotationally secured to spline 122. In this embodiment, torque is transferred to the rotary driven unit from spline 124 of hub 120 through spline 126 of transmission input shaft 128.

Figure 6B:
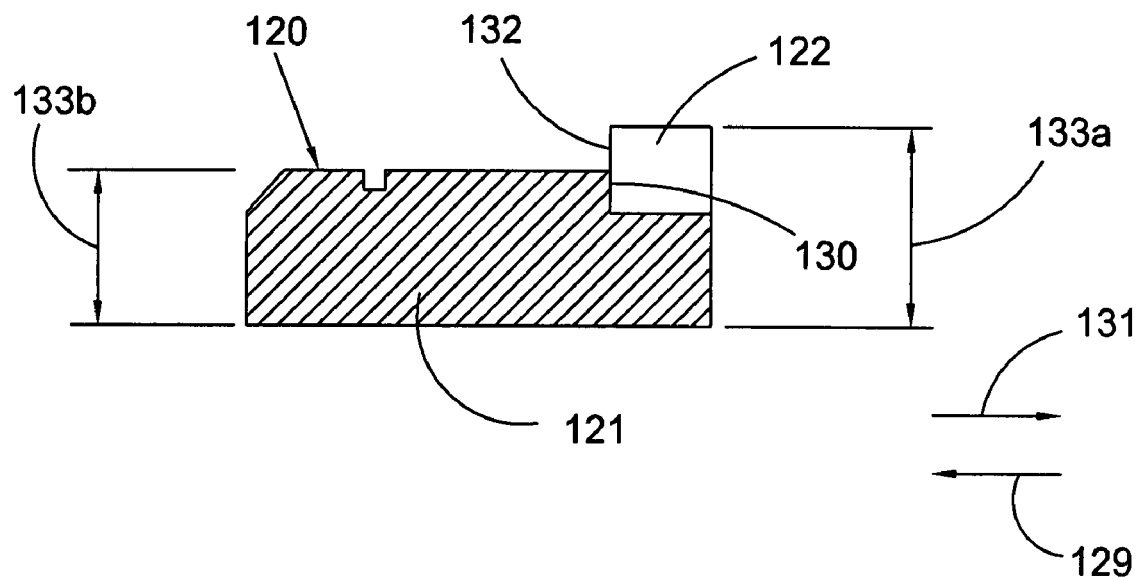
FIG. 6B is a view of the hub in FIG. 6A with plates removed.

FIG. 6B is a view of hub 120 in FIG. 6A with plates 116 and 117 removed. Plate 116 is fixed in axial direction 129 by radial surface 130 of hub 120 and plate 117 is fixed in axial direction 131 by radial surface 132 of hub 120. In some aspects, surfaces 130 and 132 are coplanar. In some aspects, protrusion 122, in particular, spline 122, includes surface 132 and body 121 of the hub forms surface 130. In general, protrusion 122 has a diameter 133a, greater than diameter 133b for hub 120. Since plates 116 and 117 are rotationally connected, surfaces 130 and 132 serve to axially fix turbine 104 with respect to the hub. That is, rivets 118 fixedly secure plates 116 and 117, holding the plates against surfaces 130 and 132, respectively. It should be understood that other components (not shown), such as washers, can be placed between the plates and the radial surfaces as long as these components are, stable in an axial direction.

In some aspects (not shown), the axial positions of plates 116 and 117 are reversed. That is, plate 116 engages surface 130 and plate 117 engages surface 132 and is rotationally connected to the hub.

Figure 7:
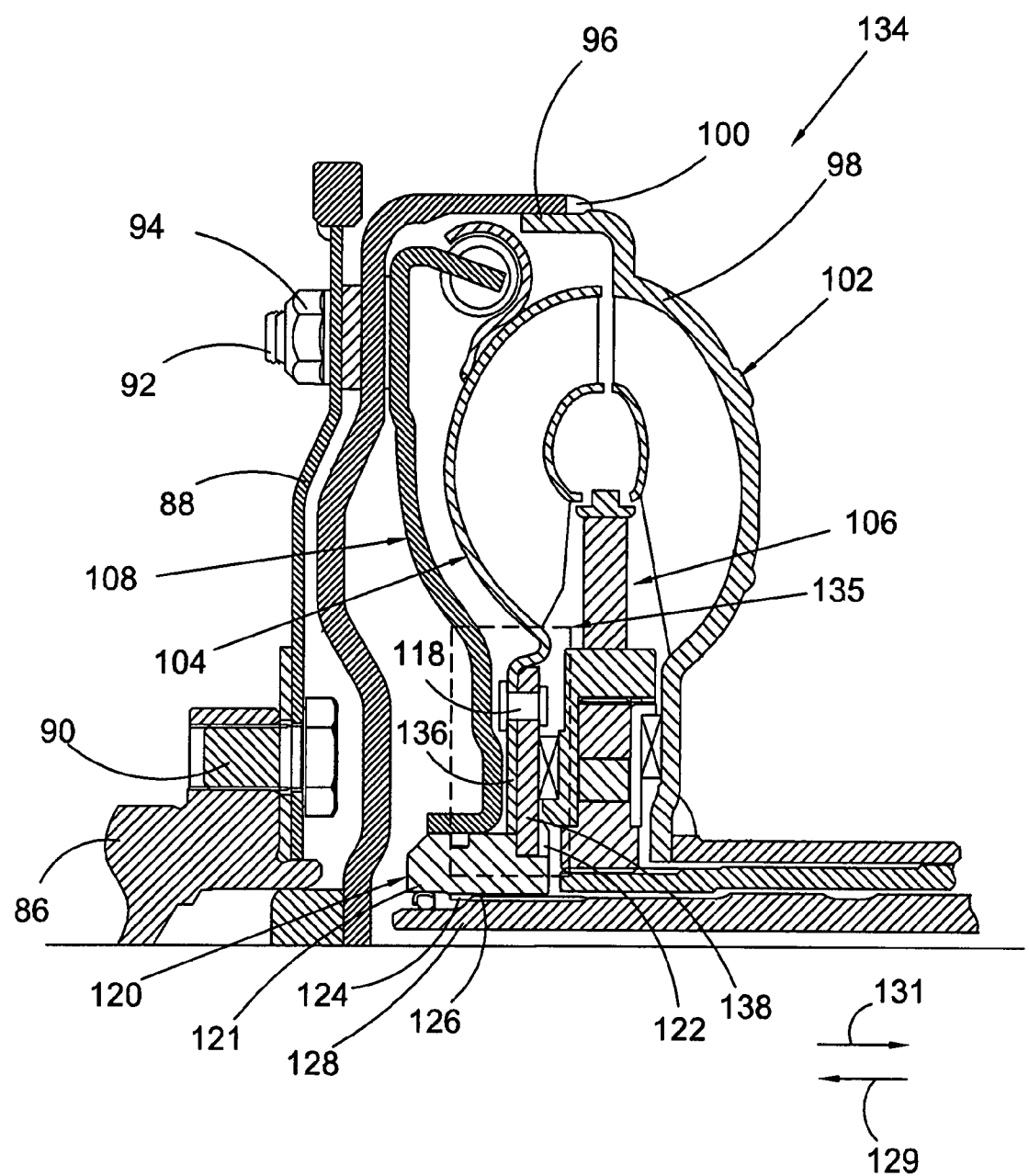
FIG. 7 is a partial cross-sectional view of a torque converter with a present invention hub assembly.

FIG. 7 is a partial cross-sectional view of torque converter 134 with present invention hub assembly 135. FIG. 7 is similar to the embodiment shown in FIG. 6A, however in this instance torque converter 134 does not include a damper mechanism, i.e., springs and spring retainer, in the riveted connection. Instead, spring retainer 114 is directly connected to turbine 104 by a weld. Plate 136 is rotationally connected to turbine 104 and drive plate 138 is rotationally connected to plate 136 by any means known in the art, for example, rivets 118. In some aspects, plate 136 is integrally formed with the turbine. In some aspects (not shown), plate 136 is separately formed from the turbine and fixedly connected to the turbine by any means known in the art.

In some aspects, hub 120 is used in assembly 135. Referring to FIG. 6B, plate 136 is fixed in axial direction 131 by radial surface 132 of hub 120 and plate 138 is fixed in axial direction 129 by radial surface 130 of hub 120. Since plates 136 and 138 are rotationally connected, surfaces 130 and 132 serve to axially fix turbine 104 with respect to the hub. That is, rivets 118 fixedly secure plates 136 and 138, holding the plates against surfaces 130 and 132, respectively. It should be understood that other components (not shown), such as washers, can be placed between the plates and the radial surfaces as long as these components are stable in an axial direction.

Drive plate 138 is rotationally connected to hub 120. As noted above, hub 120 includes at least one radially disposed protrusion. In some aspects, the protrusion is spline 122 and plate 138 is rotationally secured to spline 122. Torque is transferred to the rotary driven unit from spline 124 of hub 120 through spline 126 of transmission input shaft 128.

In some aspects (not shown), the axial positions of plates 136 and 138 are reversed. That is, plate 138 engages surface 132 and plate 136 engages surface 130 and is rotationally connected to the hub.

Figure 8B:
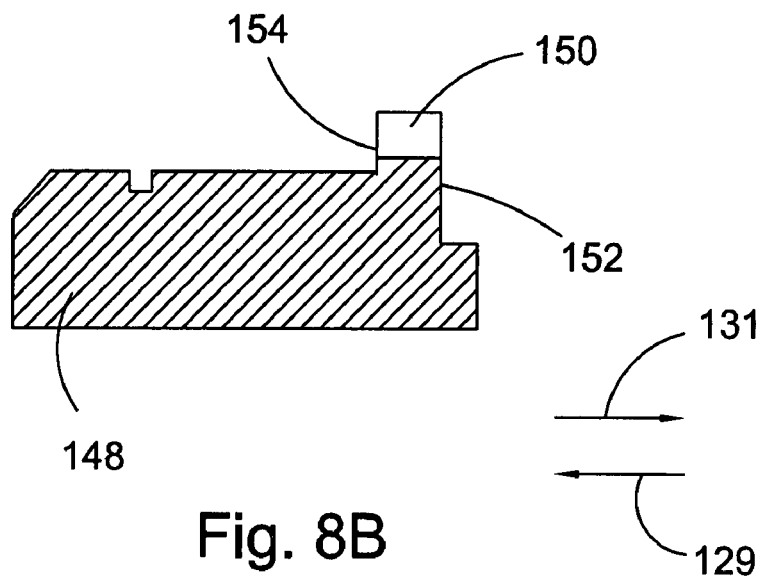
FIG. 8B is a view of the hub in FIG. 8A with plates removed.
Figure 8A:
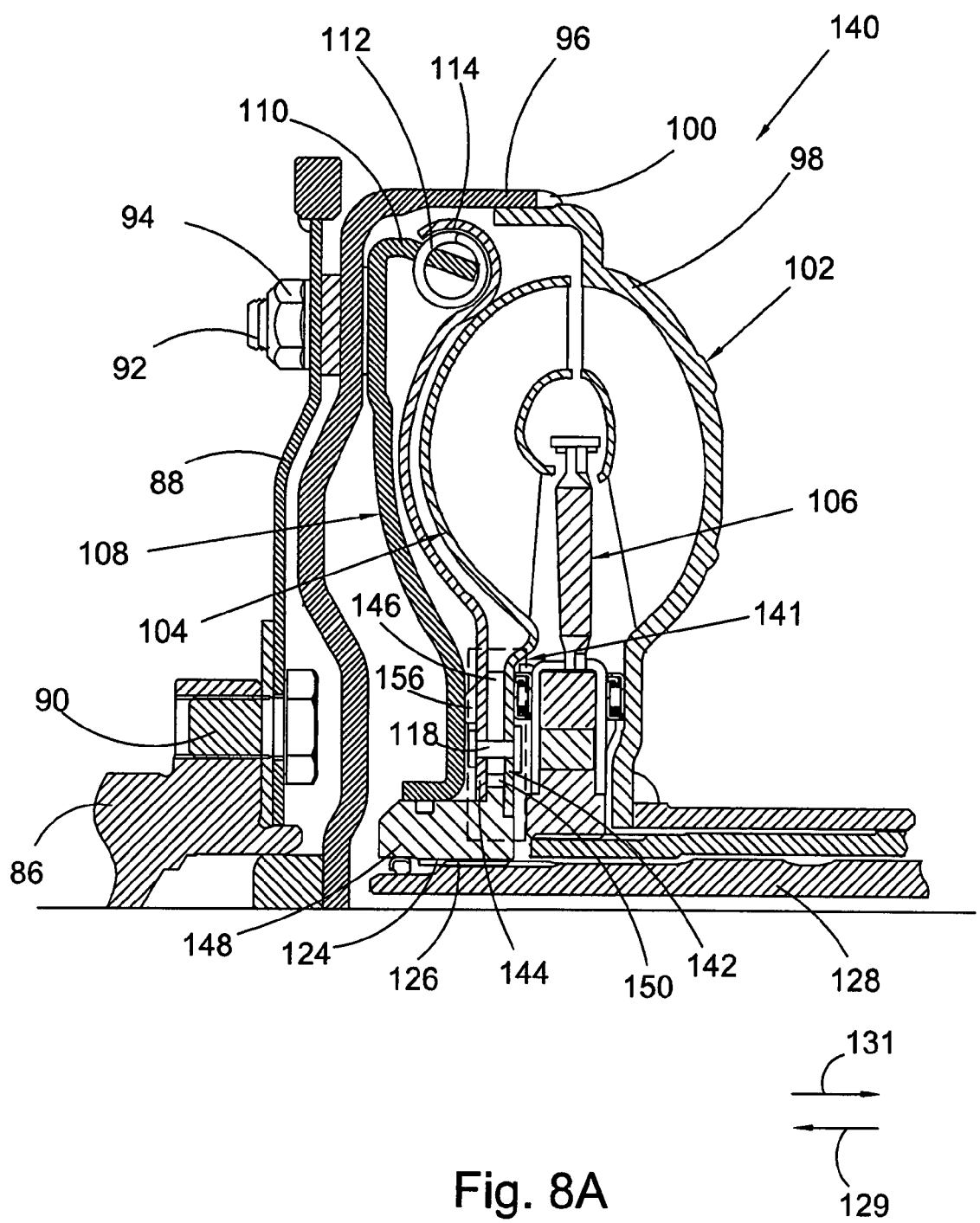
FIG. 8A is a partial cross-sectional view of a torque converter with a present invention hub assembly.

FIG. 8A is a partial cross-sectional view of torque converter 140 with present invention hub assembly 141. Plate 142 is rotationally connected to turbine 104, plate 144 is rotationally connected to retainer 114, and drive plate 146 is rotationally connected to hub 148 and plates 142 and 144. In some aspects, plate 142 is integrally formed with the turbine. In some aspects (not shown), plate 142 is separately formed from the turbine and fixedly connected to the turbine by any means known in the art. In some aspects, plate 144 is integrally formed with the retainer. In some aspects (not shown), plate 144 is separately formed from the retainer and fixedly connected to the retainer by any means known in the art. Hub 148 includes at least one radially disposed protrusion. In some aspects, the protrusion is spline 150 and plate 146 is rotationally secured to spline 150.

FIG. 8B is a view of hub 148 in FIG. 8A with plates 142, 144, and 146 removed. Plate 142 is fixed in axial direction 129 by radial surface 152 of hub 148 and plate 144 is fixed in axial direction 131 by radial surface 154 of hub 148. In some aspects, surfaces 152 and 154 are coplanar. Since plates 142 and 144 are rotationally connected, surfaces 152 and 154 serve to axially fix turbine 104 with respect to the hub. That is, rivets 118 fixedly secure plates 142 and 144, holding the plates against surfaces 152 and 154, respectively. It should be understood that other components (not shown), such as washers, can be placed between the plates and the radial surfaces as long as these components are stable in an axial direction. In some aspects, drive plate 146 includes tabs 156 which provide axial stops for torque converter clutch 108.

Figure 9:
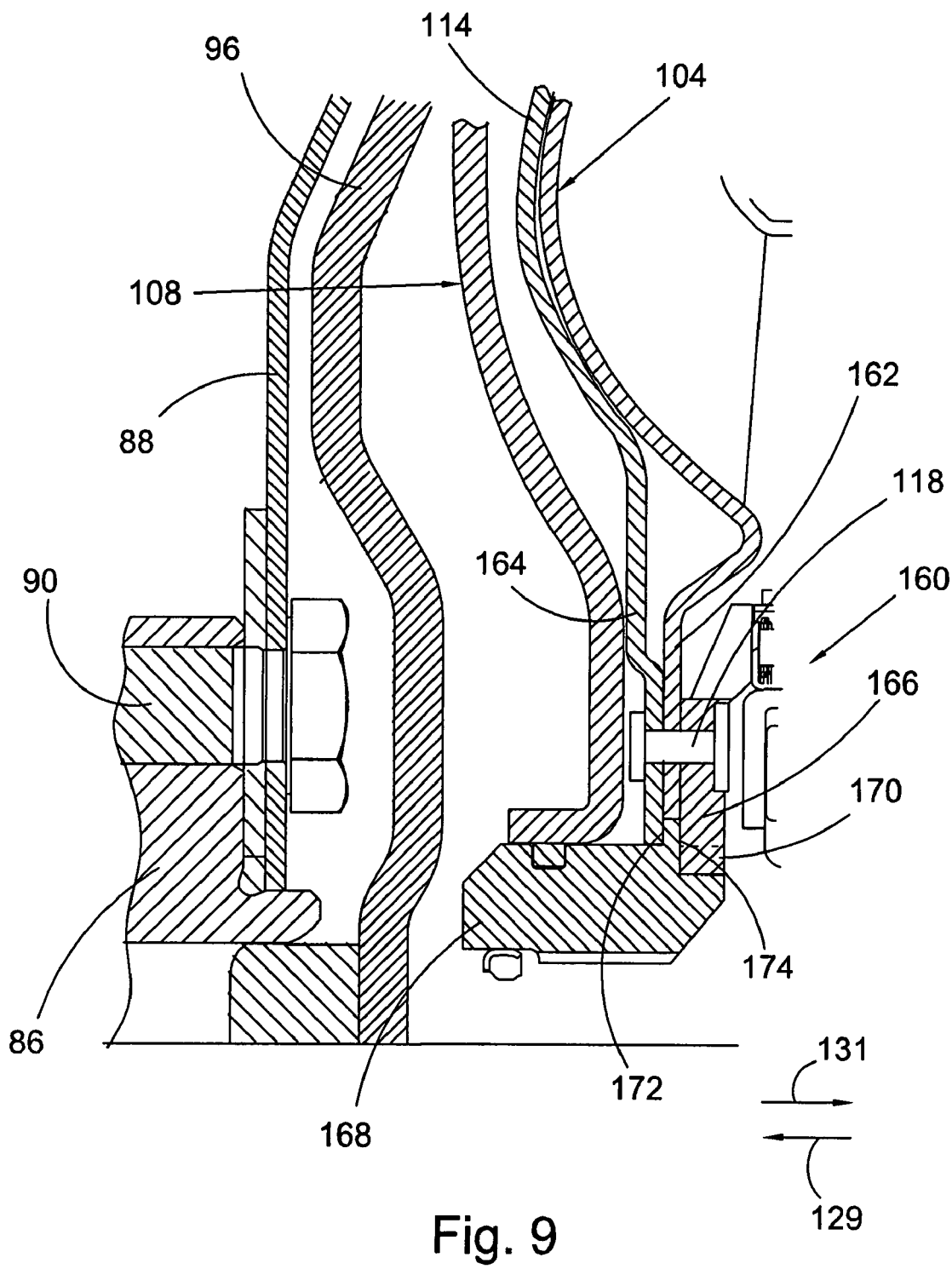
FIG. 9 is a partial cross-sectional view of a torque converter with a present invention hub assembly.

FIG. 9 is a partial cross-sectional view of a torque converter with present invention hub assembly 160. Plate 162 is rotationally connected to turbine 104, plate 164 is rotationally connected to retainer 114, and drive plate 166 is rotationally connected to plates 162 and 164. Plate 166 is rotationally connected to hub 168 via spline 170. In some aspects, plate 162 is integrally formed with the turbine. In some aspects (not shown), plate 162 is separately formed from the turbine and fixedly connected to the turbine by any means known in the art. In some aspects, plate 164 is integrally formed with the retainer. In some aspects (not shown), plate 164 is separately formed from the retainer and fixedly connected to the retainer by any means known in the art. Hub 168 includes at least one radially disposed protrusion. In some aspects, the protrusion is spline 170 and plate 166 is rotationally secured to spline 170.

Plate 164 is fixed in axial direction 131 by radial surface 172 of hub 168 and plate 166 is fixed in axial direction 129 by radial surface 174 of hub 168. In some aspects, surfaces 172 and 174 are coplanar. Since plate 162 is rotationally fixed with respect to plates 164 and 166, surfaces 172 and 174 serve to axially fix turbine 104 with respect to the hub. That is, rivets 118 fixedly secure plates 164 and 166, holding the plates against surfaces 172 and 174, respectively. It should be understood that other components (not shown), such as washers, can be placed between the plates and the radial surfaces as long as these components are stable in an axial direction.

It should be understood that a present invention hub assembly is not limited to the configurations shown in the figures and that other configurations are within the spirit and scope of the claimed invention. For example, different sizes, shapes, and orientations of components, such as plates, are possible.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A hub assembly for a torque converter, comprising:
   a hub arranged to rotationally connect to a transmission input shaft and comprising first and second radial surfaces;
   a first plate rotationally connected to a turbine, rotationally connected to said hub, and fixed in a first axial direction by said first surface; and,
   a second plate rotationally connected to said first plate and fixed in a second axial direction, opposite said first direction, by said second surface, wherein said first plate is rotationally connected to said second plate at a location radially displaced from said first and second radial surfaces.

2. The hub assembly of claim 1 wherein said hub comprises at least one radially disposed protrusion, said protrusion comprises said second radial surface, and said first plate is rotationally connected to said protrusion.

3. The hub assembly of claim 1 wherein said hub comprises a body with a first diameter and said protrusion comprises a second diameter greater than said first diameter.

4. The hub assembly of claim 3 wherein said body comprises said first surface.

5. The hub assembly of claim 1 further comprising at least two rivets, said rivets fixedly securing said first and second plates.

6. The hub assembly of claim 1 wherein said second plate is integrally formed with said turbine.

7. The hub assembly of claim 1 wherein said second plate is separately formed from said turbine and fixedly connected to said turbine.

8. The hub assembly of claim 1 wherein said torque converter further comprises a first spring retainer and said second plate is rotationally connected to said spring retainer.

9. The hub assembly of claim 8 wherein said second plate is integrally formed with said spring retainer.

10. The hub assembly of claim 8 wherein said second plate is separately formed from said spring retainer and fixedly connected to said spring retainer.

11. The hub assembly of claim 1 wherein said first and second radial surfaces are arranged to axially fix said turbine with respect to said hub.

12. The hub assembly of claim 1 wherein said first and second radial surfaces are coplanar.

13. The hub assembly of claim 1 wherein said first plate is in contact with said first radial surface.

14. The hub assembly of claim 1 wherein said second plate is in contact with said second radial surface.

15. A hub assembly for a torque converter, comprising:
a hub arranged to rotationally connect to a transmission input shaft and comprising first and second radial surfaces;
a first plate rotationally connected to a turbine and fixed in a first axial direction by said first surface;
a second plate fixed in a second axial direction, opposite said first direction, by said second surface; and,
a third plate rotationally connected to said hub and said first and second plates.

16. The hub assembly of claim 15 wherein said hub comprises a body and at least one radially disposed protrusion, said body comprises said first radial surface, said protrusion comprises said second radial surface, and said third plate is rotationally connected to said protrusion.

17. The hub assembly of claim 15 wherein said first plate is integrally formed with said turbine.

18. The hub assembly of claim 15 wherein said first plate is separately formed from said turbine and fixedly connected to said turbine.

19. The hub assembly of claim 15 wherein said torque converter further comprises a spring retainer and said second plate is rotationally connected to said spring retainer.

20. The hub assembly of claim 19 wherein said second plate is integrally formed with said spring retainer.

21. The hub assembly of claim 19 wherein said second plate is separately formed from said spring retainer and fixedly connected to said spring retainer.

22. The hub assembly of claim 15 wherein said first and second radial surfaces are arranged to axially fix said turbine with respect to said hub.

23. A hub assembly for a torque converter, comprising:
a hub arranged to rotationally connect to a transmission input shaft and comprising first and second radial surfaces;
a first plate rotationally connected to a turbine and said hub;
a second plate fixed in a first axial direction by said first radial surface; and,
a third plate rotationally connected to said first and second plates and fixed in a second axial direction, opposite said first direction, by said second surface.

24. The hub assembly of claim 23 wherein said hub comprises a body and at least one radially disposed protrusion, said protrusion comprises said first radial surface, said body comprises said second radial surface, and said first plate is rotationally connected to said protrusion.

25. The hub assembly of claim 23 wherein said first plate is integrally formed with said turbine.

26. The hub assembly of claim 23 wherein said first plate is separately formed from said turbine and fixedly connected to said turbine.

27. The hub assembly of claim 23 wherein said torque converter further comprises a spring retainer and said second plate is rotationally connected to said spring retainer.

28. The hub assembly of claim 27 wherein said second plate is integrally formed with said spring retainer.

29. The hub assembly of claim 27 wherein said second plate is separately formed from said spring retainer and fixedly connected to said spring retainer.

30. The hub assembly of claim 23 wherein said first and second radial surfaces are arranged to axially fix said turbine with respect to said hub.

31. A hub assembly for a torque converter, comprising:
a hub arranged to rotationally connect to a transmission input shaft and comprising first and second radial surfaces;
a plate fixedly connected to a turbine, rotationally connected to said hub, and fixed in a first axial direction by said first surface; and,
a spring retainer fixedly connected to said plate and fixed in a second axial direction, opposite said first direction, by said second surface.

32. The hub assembly of claim 31 wherein said first and second radial surfaces are arranged to axially fix said turbine with respect to said hub.

33. A hub assembly for a torque converter, comprising:
a hub arranged to rotationally connect to a transmission input shaft and comprising first and second radial surfaces;
a plate fixedly connected to a turbine, rotationally connected to said hub, and fixed in a first axial direction by said first surface; and,
a turbine fixedly connected to said plate, and fixed in a second axial direction, opposite said first direction, by said second surface, wherein said plate is fixedly connected to said turbine at a location radially displaced from said first and second radial surfaces.

34. The hub assembly of claim 33 wherein said first and second radial surfaces are arranged to axially fix said turbine with respect to said hub.

* * * * *